May 2, 1939.    D. J. CHRISTENSEN    2,156,524
VARIABLE SCALE
Filed Feb. 27, 1937

INVENTOR
David J. Christensen
By Walter G. Miller
ATTORNEY

Patented May 2, 1939

2,156,524

UNITED STATES PATENT OFFICE 2,156,524

VARIABLE SCALE

David J. Christensen, Berkeley, Calif.

Application February 27, 1937, Serial No. 128,180

6 Claims. (Cl. 33—107)

This invention relates to a linear measuring device or scale and particularly refers to a variable scale which is continuously adjustable to represent and to measure distances or linear dimensions in any desired scale of division units.

Heretofore fixed scales or rules have been used, suitably subdivided into the required numbers or divisions, for example as in inches by sixty fourths or one hundredths, or in meters, centimeters and millimeters. Where maps and the like that are drawn to a fixed ratio scale of say 1 inch equals one mile, are to be measured, suitably divided and numbered portable scales engraved or ruled on wood, celluloid or metal are employed with which to lay out or to measure distances. Oftentimes it becomes necessary to reproduce maps photographically and enlarge or reduce them so that the original scale ratio no longer applies, so that subsequent measuring off or laying out involves a very tedious and arduous use of proportional dividers and similar apparatus involving fixed ratios with only one unit of scale length.

The increasing utilization of airplane photographs to form mosaic maps, often to ratios of actual to represented distances that are not found on standard scales, renders measurements of distances and representation of natural or proposed features, contour lines and the like very difficult, tedious and slow, and greatly increases the time and cost to prepare such maps.

In measuring distances on blueprints or other reproductions where shrinkage of the paper is different in one direction from that in another, common fixed scales are inapplicable and special scales or dividers must be used.

In the division of a given distance into any desired number of units, as in the interpolation of contours, or the transferring of distances from one map to another of different scale as well as for the other uses just described the continuously variable scale of this invention has been found to be of very great value and has materially reduced the time and effort required for such work, as well as increased the accuracy of the results.

Broadly speaking, this invention comprises a generally rectangular elongated sheet or chart on which are ruled a number of variably spaced lines, suitably indexed as to units, tens, hundreds and the like. In its preferred form, as will be discussed below, one of these lines is parallel to a side of the chart and the remainder are disposed in uniformly or linearly converging relation thereto, or according to any other desired mathematical relation, such as a logarithmic or exponential relation. Along the edge of the chart and beside the parallel or base line just described is preferably marked at intervals the scale ratios that would be represented on what may be defined as a working line at right angles to the base line and extending transversely across the width of the chart. Along the opposite edge, other scale ratios may be designated, for example an English system of linear units may be shown on one side, and the corresponding metric ratios may be properly positioned on the other side. Thus there may be formed a direct conversion scale, with the divisions between the two indices automatically predetermined to be in proper and unvarying relationship.

In order to present the working line just mentioned to a map or drawing or photograph so that distances may conveniently and accurately be measured thereon, a means for turning the unused portion of the scale back or away from the work should be provided. In the example shown, this is done by mounting the strip or chart on a pair of parallel rollers held in a suitable frame and then passing the intermediate face of the chart around a straight edge or guide means parallel to the roller axes, so that the desired working line along which is the scale to be used is visible and in close proximity to the working surface so as to be aligned thereon.

If desired, the continuously variable feature of the scale may be dispensed with and a multiple or succession of fixed scales may be presented along the chart face. This would not include all the desirable features of the preferred embodiment, even though it is a specific variation of the uniformly converging line arrangement just described.

It is, therefore, an object of this invention to provide a continuously variable linear scale that will maintain accurate and unvarying choice of dimensions, ratios, and adjustment.

Another object is to provide a variable linear scale adapted to present a working line that will be capable of close juxtaposition to the surface on which measurements are to be made.

Another object is to provide a linear scale that may be continuously varied by minute increments to present any desired scale ratio to a linear distance to be measured.

Yet another object is to provide a universal scale which may be used in conjunction with conversion factors to accommodate any system of linear measurement, and which may be used directly to convert various units such as feet to meters, chains to feet, miles to kilometers, statute to nautical miles, etc.

Another object is to provide a convenient and readily usable means for carrying and presenting a variable scale chart, that will permit of quick and accurate adjustment of the latter and will hold that adjustment during normal use.

Another object is to provide an economical and inexpensive universal scale that will obviate the present requirement for a great number of fixed scales, proportional dividers and the like when handling drawings, maps, photographs and the like having widely varying scale ratios.

These and other objects will be more fully apparent from the following description and from the attached drawing, which forms a part of this specification and illustrates a preferred embodiment of this invention.

In the drawing, Figure 1 is a developed plan view, partially broken away, of one type of chart carrying continuously variable scale rulings and illustrating the relation which may be displayed between the English and metric conversions and ratios.

Figure 1:
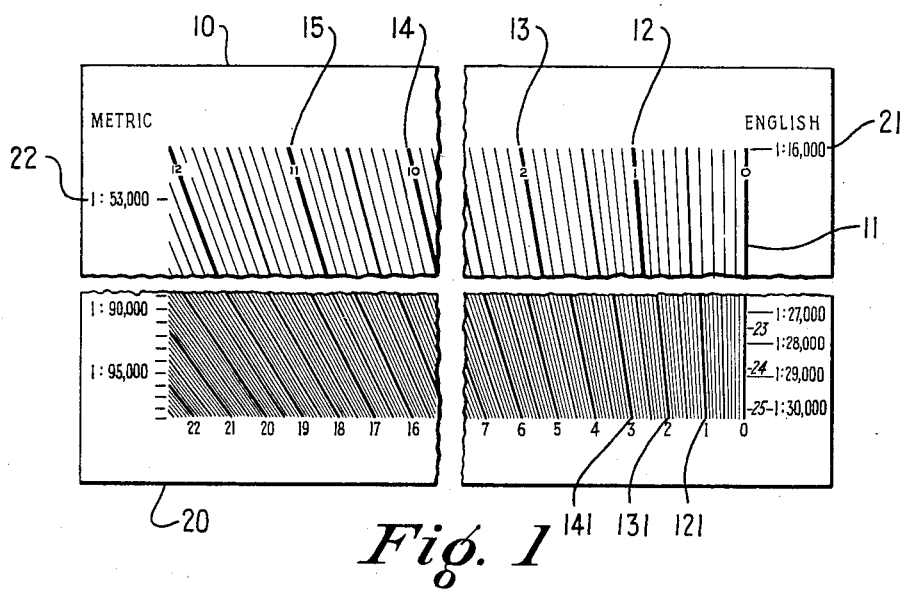

Referring to the drawing and particularly to Figure 1, the reference numeral 10 designates a chart which may be of a flexible material, such as paper, metal foil or paper mounted on cloth, or filled cloth, on which is ruled or printed line 11, which is preferably parallel to one edge of the chart 10 and forms the base line or zero line from which measurements are made. Equally spaced along a previously defined working line, or line at right angles to the base line 11 and to the chart edge, and which working line may or may not be actually drawn on the chart, as in the present case it is not actually drawn, are the remaining lines 12, 13, 14, 15, . . ., of the chart scale. In this example these latter converge uniformly toward the bottom or lower edge 20 of the chart, where they are designated 121, 131, 141, . . ., as shown.

The present example shows the commonly used English scale ratios 21 suitably spaced along the right edge of chart 10, each indicated on the working line corresponding to the ratio in question. The spacings of lines 13, 14, . . ., and their degree of convergence toward 131, 141, . . . are matters of choice to conform to the scale ratios that are desired for the particular chart to be used, and their preparation and ruling will be readily accomplished from this description by anyone skilled in this art. The corresponding metric scale ratios 22 may be illustrated along the left edge of chart 10 as shown. Obviously, other than linear mathematical relations may be expressed in these rulings, and are comprehended by this invention, which relates generically to a varying scale.

Figure 3:
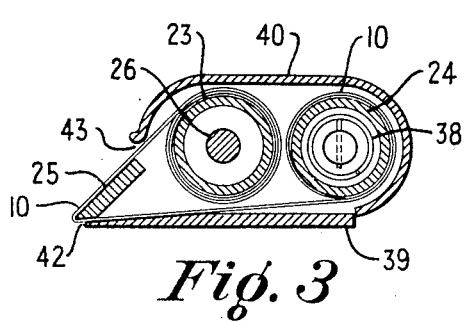
Figure 3 is a sectional view on line III—III of the scale assembly shown in Figure 2, and particularly illustrates the edge member or means over which the scale chart passes so as to be presented closely adjacent to the surface on which a measurement is to be made.

In order that the various working lines, of which these are obviously an infinite number for any particular chart such as the one illustrated, may be suitably presented to the observer of the scale in their proper and convenient relation to the working surface, may, or the like on which the scale is to be laid, the present example utilizes two parallel rollers 23 and 24 between which the flexible chart 10 is mounted so as to be visible over and to pass around an edge number 25 also parallel to rollers 23 and 24 and preferably closely adjacent the bottom of the device (Figure 3).

Roller 23 is supported on a shaft 26 journalled to rotate in side frames 27 and 28. A knob or handle 29 is fixed to one end of shaft 26 to turn the same in either direction. At the opposite end of shaft 26 is preferably mounted a clutch or brake means adapted selectively to lock or retain the shaft 26, roller 23 and chart 10 in any desired position. In this example, the clutch comprises a knob or handle 30 slidably mounted on shaft 26 and keyed thereto as by screw 31. A nut 32 on the end of shaft 26 retains spring 33 which urges knob 30 toward side frame 28 so that the tapered clutch member 34 will frictionally engage the complementary tapered bore 35 in that frame. When it is desired to release roller 23, so that it may be rotated by knob 29, the clutch member 34 is released by pulling outwardly on knob 30, against the tension of spring 33.

The second chart supporting roller 24 is provided with a freely rotatable end bearing stud 36 journalled in side frame 28, and an opposite end bearing stud 37 fixed in side frame 27. Roller 24 is rotatable with respect to stud 37 and, in this example, is given a substantially uniform counterclockwise (Fig. 3) turning moment as by a long helical spring 38, which extends between studs 36 and 37. Thus roller 24 always tends to keep taut that portion of chart 10 between itself and roller 23 for any position of the chart with respect to edge member 25, the latter roller being normally locked in position in frame 28 by the spring actuated clutch member 34.

Figure 2:
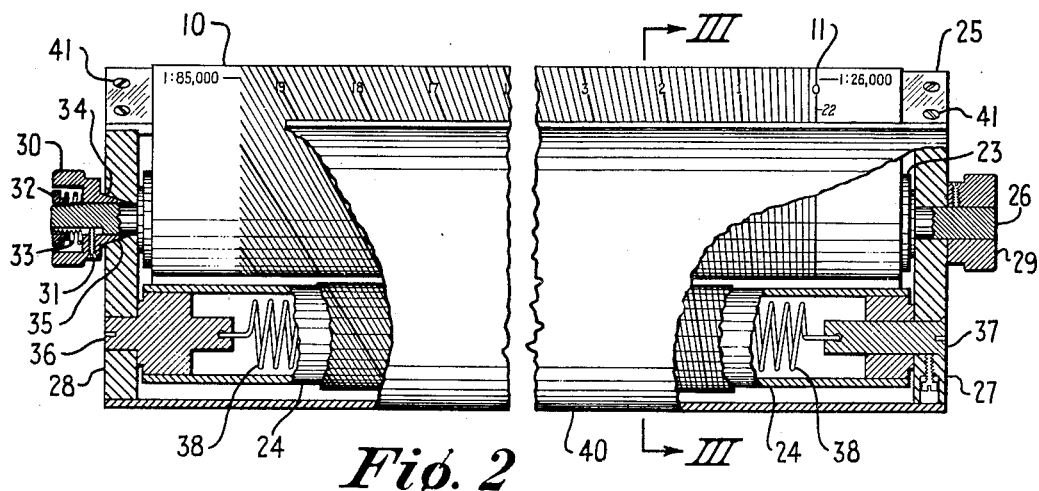
Figure 2 is a plan view, partially in section, of a complete variable scale assembly with roller means for varying the position of the variable scale chart with respect to the working line.

Completing the body of the example illustrated is a bottom member 39 suitably secured to side frames 27 and 28, and a top or shield 40 which serves to cover and protect the rollers 23 and 24 and the unused part of chart 10. Edge member 25 is also suitably supported between side frames 27 and 28, as by screws 41, and is spaced from bottom member 39 and top 40 to form the transverse slots 42 and 43, respectively, through which chart 10 passes so that the scale theeron will be visible above edge member 25, as shown in Figures 2 and 3.

It is obvious that many modifications and changes could be made in the supporting and actuating means just described, without departing from the essential features of the invention, which appear to reside in the continuously variable chart with its infinite number of working lines at right angles to the base or zero line, these being formed, in this example, by the uniformly converging lines on the chart face. The invention also comprehends means for selectively presenting such a chart at or adjacent a means forming an edge which is adapted to be positioned so as to be aligned with a given line or lines on a map, drawing, photograph or the like working surface to measure linear distance thereon in the desired scale units.

Therefore, although a specific example of this invention and its mode of utilization and operation have been given in this description, it is not limited thereto and all modifications and changes that come within the scope of the appended claims are embraced thereby.

I claim:
1. A measuring device of the type described, comprising a frame adapted to be placed on a plane surface, a flexible chart movably positioned in said frame, and an edge member for said frame, the lower edge of said member being positioned substantially in the bottom plane of said frame, said chart extending across the last named edge member at the lower edge thereof and backwardly therebeneath to present a working line across the width of said chart and substantially in the plane of said base.

2. A measuring device according to claim 1, with the addition of rollers for holding that portion of the chart that is not extended across said edge member.

3. A measuring device according to claim 1, with the addition of two rollers for supporting said chart, and means for moving one of said rollers to expose different parts of said chart at said edge member.

4. A measuring device according to claim 1, with the addition of a cover for said frame, to conceal all of said chart except that portion just adjacent said edge member.

5. A measuring device of the type described, comprising a frame adapted to be placed on a plane surface, a flexible chart movably supported in said frame, a base for said frame, an edge member at one side of said base and spaced therefrom to form a slot, means forming a second slot in said frame above said edge member, said chart adapted to pass through said slots and around said edge member to present a working line at the lower edge of said edge member and substantially in the plane of said base.

6. A measuring device according to claim 5, with the addition of rollers for supporting said chart, and means for imparting a torque to one of said rollers to hold said chart taut over said edge member.

DAVID J. CHRISTENSEN.